United States Patent [19]
Ryding

[11] Patent Number: 5,636,696
[45] Date of Patent: Jun. 10, 1997

[54] HOOF SENSITIVITY TESTING DEVICE

[76] Inventor: Paul Ryding, 3500 E. 45th North, Wichita, Kans. 67220

[21] Appl. No.: 529,619

[22] Filed: Sep. 18, 1995

[51] Int. Cl.⁶ .................. A01L 11/00; A01L 15/00
[52] U.S. Cl. .................. 168/45; 81/386; 81/355
[58] Field of Search .................. 168/45; 294/3; 81/355, 356, 386, 424

[56] References Cited

U.S. PATENT DOCUMENTS

| | | | |
|---|---|---|---|
| 14,243 | 2/1856 | Keehnold | 81/356 |
| 68,567 | 9/1867 | Koyl | 168/45 |
| 1,019,605 | 3/1912 | Cummings | 81/386 X |
| 5,022,291 | 6/1991 | McBain | 81/424 |

*Primary Examiner*—Robert P. Swiatek
*Attorney, Agent, or Firm*—Bradley P. Sylvester

[57] ABSTRACT

A hoof sensitivity testing device, in which an L-shaped member, having a handle and a slide, is positioned so that the slide passes through a hole in a pivoting arm, having a handle and a jaw. The pivoting arm rotationally moves around a pivot pin, located on the L-shaped member and pivoting arm. A second jaw is positioned on the slide, which allows the second jaw to move laterally in relation to the first jaw, so that the mouth portion, defined by the jaws, can grip a wide range of objects. The adjustable positioning of the jaws allow them to apply force along a shared axial line to various portions of the bottom of an animal hoof, to test for sensitivity to pressure in the hoof.

5 Claims, 2 Drawing Sheets

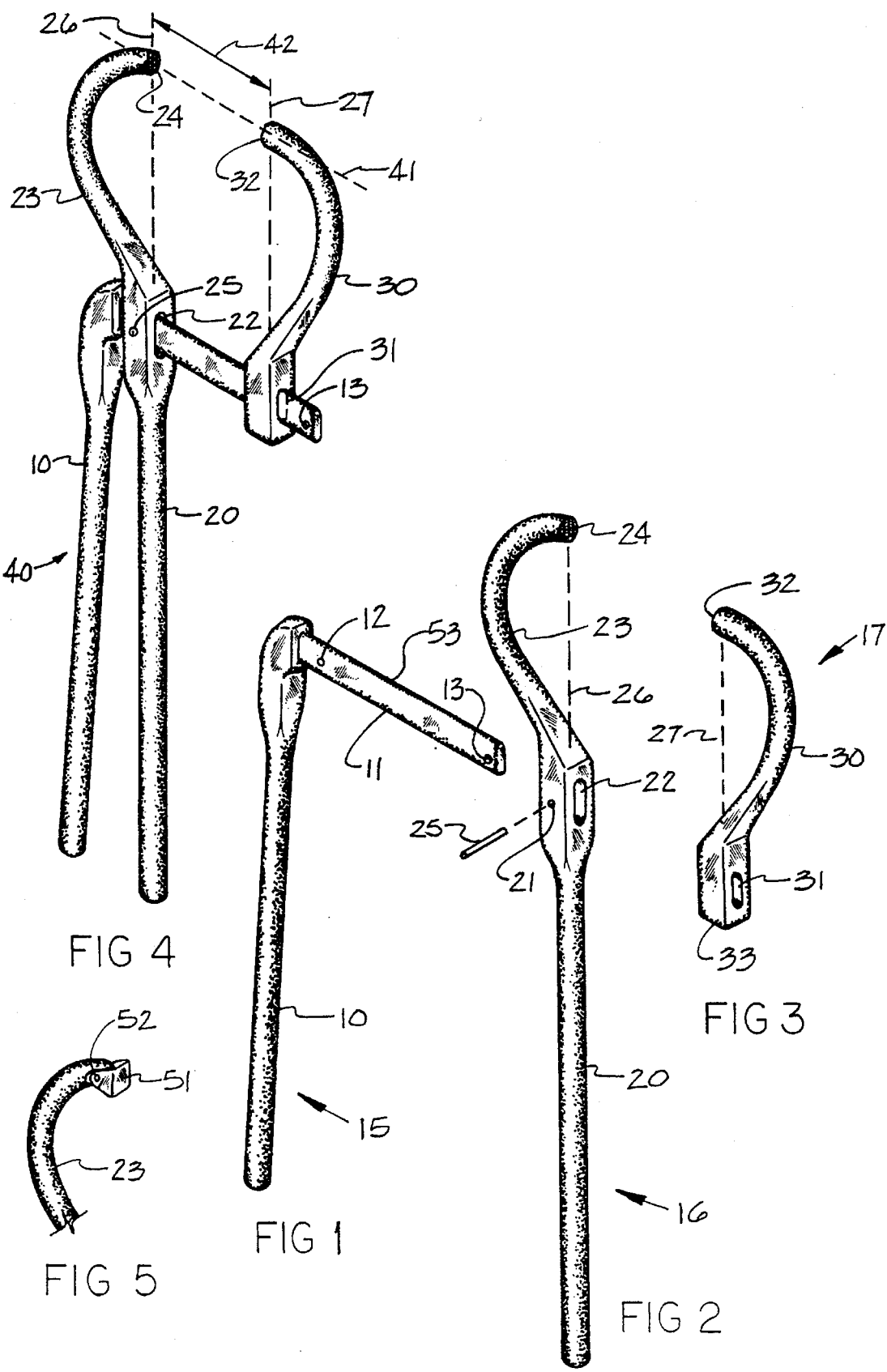

HOOF SENSITIVITY TESTING DEVICE

BACKGROUND OF THE INVENTION

Animals with hooves can develop infections and have other problems with their hooves. An early detection of many problems is possible by testing the sensitivity of the hoof, when pressure is applied directly to a small area on the bottom or ground contact surface of the hoof.

Typically, large scissor-like clamps are used, with both handles being urged together to squeeze the hoof at various points. The hoof is tested around the bottom perimeter and the internal area of the flat walking surface of the hoof. If the animal flinches in an unusual manner, while pressure is being applied, then there is a potential problem with the hoof in that area.

In order to properly examine the hoof, and perform the numerous pressure point tests, the hoof must be firmly held by the examiner, typically gripped between the examiner's legs, with the hoof portion positioned so that the bottom of the hoof can be seen and examined. The difficulty in doing this examination is that the clamp-like tool and hoof must both be held in position at the same time. Since it requires two hands to use the typical hoof clamp-like tool, the hoof itself is held only be the examiner's legs.

When the animal flinches, due to a sensitive spot being squeezed, the examiner optimally should have one hand on the hoof or animal leg, so as to stabilize and minimize any further movement. If both hands are being used to operate the hoof tester, then any movement by the animal will be more unrestricted than if a hand was able to stabilize it.

Prior tools, used to check hooves for pressure sensitivity, have comprised large scissor-like clippers or clamps, with both handles operating around a common pivot point, with the jaws connected directly to the handles. These tools require that the examiner use both hands to manipulate the handles in instances where the hoof between the jaws has a size that spreads the handles beyond the reach of a single hand. This causes the examiner to have difficulty in testing the proper area if the animal moves its hoof even slightly, since any error movements from the hands on the handles are exaggerated due to the length of the handles themselves.

Optimally the examiner uses one hand to operate the hoof testing device, with the other hand to hold the jaws of the device against the hoof prior to operation. In order to do this, using prior art examples, and still check the entire bottom of the hoof for sensitive areas, the examiner must use several clippers or clamps of different sizes. This proves unwieldy, when doing checks on a number of animals, or animals in remote locations. As a result, a need for a single plier-like device, that can be adjusted to fit the various sizes of hooves and locations on the hooves has arisen.

SUMMARY OF THE INVENTION

This invention relates to a hoof testing device, that is used to apply pressure at specific points to the underside of an animal hoof, to detect any abnormalities or diseases in the hoof. The examiner bends the animal leg so that the bottom of the hoof is visible from above, and while holding the hoof between the examiner's legs, use one hand to maintain placement of the hoof testing device on the hoof, and makes the necessary adjustments to the hoof testing device with the same hand, and uses the other hand to manipulate the hoof testing device handles to squeeze and apply pressure to the hoof.

The hoof testing device is made from three primary pieces. The first is an L-shaped member, that has an elongated handle, with a slide extending outward at ninety degrees from the handle. The slide should have a uniform cross sectional shape. Located on the slide is a pivot pin hole, located along the slide near the point where the slide and handle join together.

The second primary piece is a pivoting arm, that has a handle of similar shape and length as that on the L-shaped member. The pivoting arm has a curved C-shaped jaw, with the end of the jaw terminating at a point along an axis that runs along the length of the pivoting arm handle. The pivoting arm has a slide hole, located near the top of the handle, but below the C-shaped jaw, that travels from one side of the pivoting arm to the other, and can accommodate the cross sectional size of the slide. Perpendicular to the slide hole is a pivoting pin hole, that runs from one side of the pivoting arm to the other.

The slide is inserted through the slide hole of the pivoting arm, which is moved along the slide until the pivoting pin holes of both members are in alignment. A pivot pin is pushed through the pin holes, allowing the pivoting arm to rotate slightly about the pivot pin, in relation to the L-shaped member. The pivoting is limited by the size of the slide hole, as it contacts the sides of the slide.

The third primary piece is a slidable curved jaw, which is similar is shape and size to the C-shaped jaw portion of the pivoting arm. The slidable curved jaw has a slide hole that is smaller than the slide hole on the pivoting arm, but can still accommodate the cross sectional size of the slide. The slidably curved jaw is placed on the slide by inserting the slide through the curved jaw's slide hole, so that the curved C-shaped jaws are opposably facing each other, with their ends on the same axial line of movement, allowing the ends to contact each other as the C-shaped jaws are moved together.

The pivoting arm jaw and slidable jaw ends define a mouth, which is the distance between the two ends, and is increased or decreased through movement of the slidable jaw along the slide. The slidable jaw cannot be taken off the slide, due to a stop, or protrusion on the end of the slide, which has sufficient size and shape so that it will not pass through the slidable jaw's slide hole.

The hoof testing device is used by moving the slidable jaw to the desired location on the slide, so that the mouth can accommodate a portion of an animal's hoof. One end of a curved jaw should be in contact with the side of the hoof, with the end of the other curved jaw in contact with the bottom side of the hoof. As the handles are urged together, the jaw ends will press against the hoof along a common axial line of travel, creating pressure on the bottom of the hoof, which if tender, the animal will feel and give a detectable muscular flinch.

During the application of pressure to the hoof, the slidable jaw does not move along the slide, due to the friction between the slide and slide hole sides. This friction is increased as pressure is applied from the pivoting jaw end, which is translated from the axial line of travel perpendicularly along the slidable jaw, pressing the side walls of the slide hole even more firmly against the slide. An even distribution of pressure to the hoof, at the jaw ends, is created through the use of articulating ends, which pivot slightly, to accommodate hoof surface irregularities.

Notches, or a roughened area on the top side of the slide can assist in maintaining the slidable jaw's position on the slide, prior to pressure being applied, but the notches should be rather small, and do not need to be used as setting points for positioning the slidable jaw.

A spring member, positioned between the L-shaped member handle and the pivoting arm handle can provide a force that keeps the handles apart and in a consistent position, until squeezed together. The spring can be a coil, leaf type, or any other commonly known spring design.

When checking a hoof for tenderness, a number of pressure points are checked on the bottom of the hoof. This is done by grasping the animal's leg, and bending it so that the bottom of the hoof is exposed to view. The hoof testing device is positioned so that one jaw end is in contact with the sloped side of the hoof, with the other end contacting the area to be checked for tenderness. A dozen or more pressure tests will be performed on various locations on the hoof, with the slidable jaw being manipulated into position to squeeze the hoof properly for the test.

The hoof is generally held in position between the examiner's legs, leaving two hands to manipulate the hoof testing device. While one hand is needed to squeeze the handles together, the other hand is free to adjust the slidable jaw, while holding the hoof testing device against the hoof. This is much more advantageous than prior designs, which are similar to large pliers or scissor clamps, which do not have adjustable mouths, requiring both hands to operate the handles, which diminishes the examiner's ability to perform a number of pressure tests quickly and with sensitive accuracy. Prior types of pliers or clamps used to perform these tests have ends which both follow different arcual line of movement. This apparatus has ends that travel in a single fairly straight axial line, which allows the examiner to be more accurately aware of how much pressure is being applied to the hoof at a given point. Quick and accurate testing becomes even more important, when dealing with a large animal that does not want to have its hoof raised up for any period of time.

Accordingly, it is the object of this invention to provide a hoof testing device that can be adjusted, using a slidable jaw that fits any size of hoof, or area of the hoof, that needs to be tested through the application of pressure for tenderness or sensitivity, with the slidable jaw remaining in position during the test due to friction between the slidable jaw and the rest of the device.

It is a further object of this invention to provide two jaws whose ends that define the mouth are opposite to each other, and travel toward each other during operation of the device, along a fairly straight axial line.

It is a further object of this invention to provide a hoof testing device that can be adjusted with one hand, and operated with the other hand, regardless of the hoof size or area of the hoof being tested.

It is a further object of this invention to provide a hoof testing device that has articulated jaw ends that contact the hoof, to take into account any surface irregularities of the hoof, so as to provide a uniform pressure across the surface of the jaw ends.

It is a further object of this invention to provide a hoof testing device that has a spring member incorporated into the handles, so that the handles return to a set position when not in use.

DESCRIPTION OF THE DRAWINGS

FIG. 1 depicts a perspective view of the L-shaped member.

FIG. 2 depicts a perspective view of the pivot arm.

FIG. 3 depicts a perspective view of the slidable curved jaw.

FIG. 4 depicts a perspective view of the adjustable hoof testing device as fully assembled from the L-shaped member, pivot arm and slidable curved jaw.

FIG. 5 depicts a perspective view of the articulating end of the curved jaws.

DESCRIPTION OF THE PREFERRED EMBODIMENT

Figure 7:
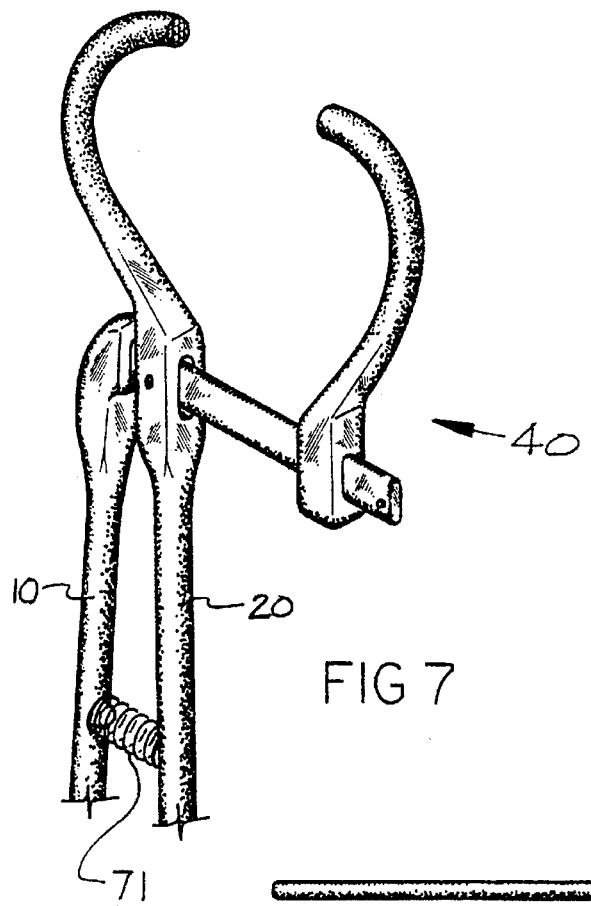
FIG. 7 depicts a perspective view of the hoof testing device with a spring located between the two handles.

Referring to FIG. 4, an adjustable hoof testing device 40 is shown fully assembled. Referring also to FIG. 1, an L-shaped member 15, has a handle 10, and a slide portion ("slide") 11, which are fixed to each other, or formed from a single piece, so that their lengths are at approximately a ninety degree angle from each other. The slide 11 should have a uniform thickness and cross sectional shape throughout its length.

The slide 11 has a slide pivot pin hole 12 located along its length, preferably near the juncture or bend of the handle 10 and slide 11. The slide pivot pin hole 12 extends through the slide 11, and has a sufficient diameter to accommodate a pivot pin 25, as depicted in FIG. 2.

Referring also to FIG. 2, a pivoting arm 16, having a handle 20 and a curved jaw portion 23 is shown. The pivoting arm handle 20 preferably has a length similar to the L-shaped handle 10. Preferably, the curved jaw portion 23 follows a fairly uniform curve shape, so that the end 24 is positioned on or near an axis 26 that intersects with the handle 20.

The pivoting arm 16 has a pivoting slide hole 22, located on the handle, adjacent to the curved jaw portion 23, with sufficient internal dimensions that allow it to receive the slide 11. A pivot arm pin hole 21 extends through the pivot arm 16, at a ninety degree angle from the pivoting slide hole 22, bisecting the pivoting slide hole 22. The pivot arm pin hole 21 has sufficient diameter so that it can receive the pivot pin 25.

The slide 11 is positioned or pushed through the pivoting slide hole 22, until the pivoting arm 16 is positioned on the slide 11, so that the pivot arm pin hole 21 aligns with the slide pin hole 12. The pivot pin 25 is pushed through the pivot arm pin hole 21 and slide pin hole 12, and then fixed in that position. The pivot pin 25 may be fixed in position by enlarging its distal ends, so that they have a diameter that does not allow them to pass through pivot arm pin hole 21. The pivot pin 25 can also be fixed to the pivoting arm 16, instead of the L-shaped member 15, so that the pivoting arm 16 and pivot pin 25 may move independently of the L-shaped member 15.

Referring also to FIG. 3, a slidable curved jaw 17 is shown, having a curved portion 30, with a base 33 and an end 32. The curved portion 30 should be of similar size and dimensions as the pivoting arm curved jaw 23, with the end 32 terminating along an axis 27 that runs through the base 33.

The base has a slide hole 31, with dimensions slightly greater than the slide 11, so that the slide 11 can be inserted through the slide hole 31, with the slidable curved jaw 17 able to be moved along the length of the slide 11, but not able to rotate or pivot around the slide 11. Referring also again to FIG. 2, the pivoting slide hole 22 has greater dimensions than the slide hole 31, since the pivoting arm 16 is intended to pivot around a single point on the slide 11, while the slidable curved jaw 17 is intended to be manipulated into a desired position along the length of the slide 11.

The slidable curved jaw 17, is positioned on the slide 11, so that it opposably faces the pivoting arm curved portion 23, with the curved jaw 17 and curved portion 23, each being a mirror image of the other. The slidable curved jaw 17 may be moved along the length of the slide 11, towards the L-shaped member handle 10, until prevented from further lateral movement when the pivoting arm 15 is contacted, at which point end 24 and end 32 should meet, with their surfaces parallel so that they are able to be flush against each other. As the slidable curved jaw 17 is moved along the slide 11, away from the pivoting arm 16, the ends 24 and 32 define a mouth 42. The slidable curved jaw 17 may be moved along the slide 11, but is prevented from being taken off the slide 11 by a stop 13. The stop 13 is preferably a protrusion, which extends outward from the slide 11, and exceeds the diameter of the slide hole 31, so that the slidable curved jaw 17 can not be removed from the slide 11.

When the slidable curved jaw 17 is positioned at a desired point along the length of the slide 11, the pivoting arm 16 can be manipulated, to either increase or decrease the distance defined by the mouth 42. The movement of the pivoting arm's end 24 will be closely along an axial line 41 that bisects the central portion of the end 24 and 32 surfaces. Due to the pivoting action of the pivoting arm 16, end 24 will deviate slightly from the axial line 41, during manipulation, but this deviation is slight, so that the direction of compression force between the pivoting end 24 and the stationary end 32 will vary only slightly from the axial line 41 during manipulation.

Referring also to FIG. 7, a resilient spring member 71 may be fixed at one end to the L-shaped member handle 10, and to the pivot arm handle 20 at the other end, so that handles 10 and 20 will be urged away from each other, to return the mouth 42 to its original position when the hoof testing device 40 is not being manipulated for use. The spring member 71 may comprise any type of spring commonly known in the art, such as a leaf-type spring, or coil spring.

Figure 6:
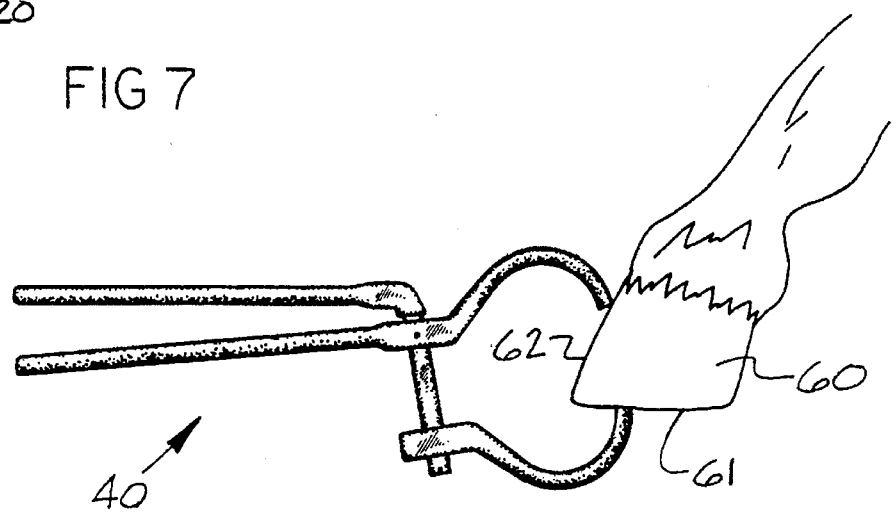
FIG. 6 depicts a side view of the hoof testing device being used on an animal hoof.

Referring also to FIG. 6, the hoof testing device 40 is positioned around an animal hoof 60, so that one of the ends 24 or 32 contacts the bottom part 61 or ground contact portion of the hoof 60 with the other end 24 or 32 contacting the side 62 of the hoof. The slidable curved jaw 17 is moved along the slide 11, to accurately measure the distance needed for the mouth 42. The pivoting arm handle 20 is urged toward the L-shaped member handle 10, with said movement translating into a compression force along the axial line 41, between ends 24 and 32.

As the ends 24 and 32 move toward each other, pressure is applied to the hoof 60 where each end 24 and 32 contacts it. The bottom side 61 of the hoof 60 may have areas of tenderness, which will be stimulated by the pressure being applied through the ends 24 and 32. Pressure on a tender area will cause the animal to indicate the tenderness by flinching the muscles in its leg. One or both of the ends 24 and 32 may have an articulating end, comprising an end piece 51 that pivots around an end pin 52, with the end pin 52 fixed to ends 24 and 32, where the end pin 52 protrudes through holes in the end piece 51, so that it rotates freely. Another method of attaching an articulating end, is to insert the end pin 52 through a hole (not shown) in the curved jaw 23, and fix the distal ends of the pin 52 to the end piece 51. The end piece 51 should be limited in its pivotal movement, since it is intended only to accommodate surface variations on the hoof 60, allowing a firm and uniform pressure point on the desired portion of the hoof 60. Although curved jaw 23 is depicted in FIG. 5, a mirror image of the end piece 51 and end pin 52 would apply to the curved portion 30 of the slidable curved jaw 17.

Referring also to FIG. 3, in order to assist the slidable curved jaw 17 in maintaining its position along the length of the slide 11, small notches 53 or roughened surface may be present on the top portion of the slide 11. The slidable curved jaw 17 relies on friction between the slide 11 and the sides of the slide hole 31, to maintain a fixed position. The amount of friction is increased, as pressure is applied along the axial line 41 to the end 32, which translates this force into a downward pressure against the slide 11. Notches 53 or a roughened area assists in maintaining position of the slidable curved jaw 17, during the time when the hoof testing device 40 is being manipulated to a desired setting, but before it is put against the hoof 60. Notches are not required, however, since this hoof testing device 40 is able to be adjusted during the examination of the hoof 60, between pressure point tests.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. An adjustable hoof testing device, that can apply pressure to specific points of the underside of an animal hoof, comprising:

(a) a rigid L-shaped member, having a handle and a slide portion, with the slide portion defining a slide pin hole;

(b) a pivoting arm, having a pivot handle and a curved jaw portion with an end that faces away from the handle of the L-shaped member, and where the pivoting arm defines a pivot pin hole and a pivot slide hole, and where the L-shaped member slide portion is positioned through the pivot slide hole;

(c) a pivot pin positioned through the slide pin hole and pivot pin hole, so that the pivoting arm rotates around the point of the pivot pin, in relation to the rigid L-shaped member;

(d) a slidable curved jaw, having a slide hole, with the L-shaped slide protruding through the slide hole, so that the slidable curved jaw opposably faces the pivoting curved jaw portion, defining a mouth, in which the slidable curved jaw is moved along the length of the slide until it is in the desired position.

2. A hoof testing device, as defined in claim one, in which the rigid L-shaped member slide portion has a stop, comprising a protrusion which extends outward from the slide portion, and exceeds the diameter of the slidable curved jaw slide hole, so that the slidable curved jaw can not be removed from the slide.

3. A hoof testing device, as defined in claim one, in which a resilient spring member is fixed at one end to the handle of the L-shaped member, and to the pivoting arm handle at the other end.

4. A hoof testing device, as defined in claim one, in which the pivoting arm curved jaw portion, and the slidable curved jaw each have an articulating end, comprising an end piece that pivots around an end pin that is fixed to the curved jaw ends, and protrudes through holes in the end piece.

5. A hoof testing device, as defined in claim one, in which the pivoting arm curved jaw portion, and the slidable curved jaw each have an articulating end, comprising an end piece that pivots around an end pin that is fixed to the end piece and protrudes through a hole in the curved jaw ends.

* * * * *